US011200005B2

United States Patent
Patel et al.

(10) Patent No.: US 11,200,005 B2
(45) Date of Patent: Dec. 14, 2021

(54) TIERING ADJUSTMENT UPON UNMAPPING MEMORY IN MULTI-TIERED SYSTEMS

(71) Applicant: International Business Machines Corporation, Armonk, NY (US)

(72) Inventors: Kushal S. Patel, Pune (IN); Sarvesh S. Patel, Pune (IN); Subhojit Roy, Pune (IN); Bharti Soni, Pune (IN)

(73) Assignee: International Business Machines Corporation, Armonk, NY (US)

( * ) Notice: Subject to any disclaimer, the term of this patent is extended or adjusted under 35 U.S.C. 154(b) by 596 days.

(21) Appl. No.: 15/833,829

(22) Filed: Dec. 6, 2017

(65) Prior Publication Data
US 2019/0171397 A1    Jun. 6, 2019

(51) Int. Cl.
*G06F 3/06* (2006.01)
*G06F 12/02* (2006.01)

(52) U.S. Cl.
CPC .......... *G06F 3/0685* (2013.01); *G06F 3/0611* (2013.01); *G06F 3/0613* (2013.01); *G06F 3/0647* (2013.01); *G06F 12/0246* (2013.01)

(58) Field of Classification Search
None
See application file for complete search history.

(56) References Cited

U.S. PATENT DOCUMENTS

| | | | |
|---|---|---|---|
| 10,176,212 B1 * | 1/2019 | Prohofsky | G06F 17/30371 |
| 2014/0074782 A1 * | 3/2014 | Green | G06F 3/061 |
| | | | 707/620 |
| 2014/0351515 A1 | 11/2014 | Chiu et al. | |
| 2016/0139821 A1 * | 5/2016 | Dolph | G06F 3/0611 |
| | | | 711/103 |
| 2016/0179678 A1 * | 6/2016 | Camp | G06F 12/0855 |
| | | | 711/103 |
| 2017/0177638 A1 * | 6/2017 | Bhosale | G06F 16/14 |

* cited by examiner

*Primary Examiner* — Charles Rones
*Assistant Examiner* — Ryan Dare
(74) *Attorney, Agent, or Firm* — Zilka-Kotab, P.C.

(57) ABSTRACT

A computer-implemented method, according to one embodiment, includes: receiving an unmap command, the unmap command identifying a first logical extent located in a higher storage tier of a multi-tiered data storage system having the higher storage tier and a lower storage tier, sending an instruction to unmap the first logical extent from the higher storage tier, sending an instruction to decrement a heat associated with the unmapped first logical extent in response to sending the instruction to unmap the first logical extent, sending an instruction to remove the unmapped first logical extent from the higher storage tier, selecting, using a heat map, at least one second logical extent located in the lower storage tier for promotion to the higher storage tier, and sending an instruction to relocate the at least one second logical extent from the lower storage tier to the higher storage tier.

19 Claims, 10 Drawing Sheets

TIERING ADJUSTMENT UPON UNMAPPING MEMORY IN MULTI-TIERED SYSTEMS

BACKGROUND

The present invention relates to data storage, and more specifically, this invention relates to the multi-tiered data storage systems.

The cost per unit (e.g., Gigabyte) of storage is typically higher for higher performing (e.g., faster) memory than it is for relatively lower performing memory. Thus, tiers of memory having different performance characteristics may be grouped together to form a multi-tiered data storage system.

The capacity of a higher data storage tier is typically smaller than the capacity of a lower data storage tier in view of their relative price. In order to maintain an efficient use of the higher performing, yet typically smaller, data storage tier, algorithms may be implemented to relocate data based on a temperature associated therewith. For example, "hotter" data may be migrated towards the higher storage tier (e.g., promoted), while "colder" data is migrated towards the slower tier (e.g., demoted). In the present context, the heat (e.g., "hotter" and "colder") of data refers to the rate (e.g., frequency) at which the data is updated. Memory blocks that are considered "hot" or "hotter" tend to have a frequent updated rate, while memory blocks that are considered "cold" or "colder" have an update rate which is at least slower than that of hot blocks. However, additional factors may be incorporated into the determination of the relative heat of a given portion of data, e.g., such as read frequency. It follows that this promotion and demotion process of data actually relocates the data from one tier to another, and may even be performed without the knowledge of an application that is running.

SUMMARY

A computer-implemented method, according to one embodiment, includes: receiving, by one or more processors, an unmap command, the unmap command identifying a first logical extent located in a higher storage tier of a multi-tiered data storage system having the higher storage tier and a lower storage tier, each storage tier having a plurality of hardware-based data storage devices; sending, by the one or more processors, an instruction to unmap the first logical extent from the higher storage tier; sending, by the one or more processors, an instruction to decrement a heat associated with the unmapped first logical extent in response to sending the instruction to unmap the first logical extent; sending, by the one or more processors, an instruction to remove the unmapped first logical extent from the higher storage tier; selecting, by the one or more processors, at least one second logical extent located in the lower storage tier for promotion to the higher storage tier; and sending, by the one or more processors, an instruction to relocate the at least one second logical extent from the lower storage tier to the higher storage tier. The at least one second logical extent is selected using a heat map.

A computer program product, according to another embodiment, includes a computer readable storage medium having program instructions embodied therewith. The computer readable storage medium is not a transitory signal per se. Moreover, the program instructions readable and/or executable by one or more processors to cause the one or more processors to perform a method which includes: receiving, by the one or more processors, an unmap command, the unmap command identifying a first logical extent located in a higher storage tier of a multi-tiered data storage system having the higher storage tier and a lower storage tier, each storage tier having a plurality of hardware-based data storage devices; sending, by the one or more processors, an instruction to unmap the first logical extent from the higher storage tier; sending, by the one or more processors, an instruction to decrement a heat associated with the unmapped first logical extent in response to sending the instruction to unmap the first logical extent; sending, by the one or more processors, an instruction to remove the unmapped first logical extent from the higher storage tier; selecting, by the one or more processors, at least one second logical extent located in the lower storage tier for promotion to the higher storage tier; and sending, by the one or more processors, an instruction to relocate the at least one second logical extent from the lower storage tier to the higher storage tier. The at least one second logical extent is selected using a heat map.

A system, according to yet another embodiment, includes: one or more processors; and logic integrated with the one or more processors, executable by the one or more processors, or integrated with and executable by the one or more processors, the logic being configured to: receive, by the one or more processors, an unmap command, the unmap command identifying a first logical extent located in a higher storage tier of a multi-tiered data storage system having the higher storage tier and a lower storage tier, each storage tier having a plurality of hardware-based data storage devices; send, by the one or more processors, an instruction to unmap the first logical extent from the higher storage tier; send, by the one or more processors, an instruction to decrement a heat associated with the unmapped first logical extent in response to sending the instruction to unmap the first logical extent; send, by the one or more processors, an instruction to remove the unmapped first logical extent from the higher storage tier; select, by the one or more processors, at least one second logical extent located in the lower storage tier for promotion to the higher storage tier; and send, by the one or more processors, an instruction to relocate the at least one second logical extent from the lower storage tier to the higher storage tier. The at least one second logical extent is selected using a heat map.

Other aspects and embodiments of the present invention will become apparent from the following detailed description, which, when taken in conjunction with the drawings, illustrate by way of example the principles of the invention.

DETAILED DESCRIPTION

Figure 1:
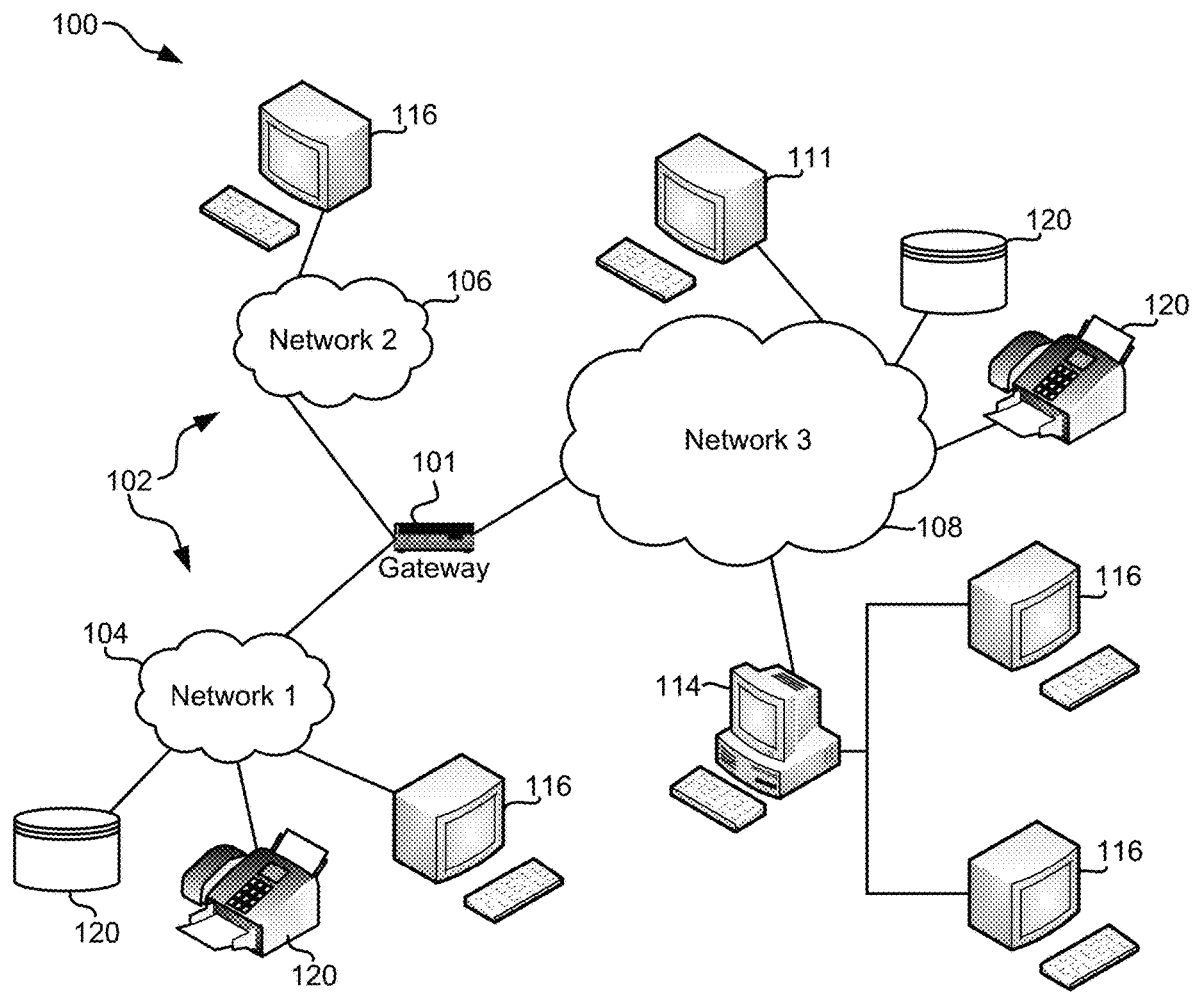
FIG. 1 is a representational view of a network architecture, in accordance with one embodiment.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The following description discloses several preferred embodiments of systems, methods and computer program products for providing efficient data management multi-tier storage architectures by making the storage architecture (e.g., storage system) aware of data block deallocation activity. By implementing such embodiments as those described herein, various improvements may desirably be achieved, e.g., as will be described in further detail below.

In one general embodiment, a computer-implemented method includes: receiving, by one or more processors, an unmap command, the unmap command identifying a first logical extent located in a higher storage tier of a multi-tiered data storage system having the higher storage tier and a lower storage tier, each storage tier having a plurality of hardware-based data storage devices; sending, by the one or more processors, an instruction to unmap the first logical extent from the higher storage tier; sending, by the one or more processors, an instruction to decrement a heat associated with the unmapped first logical extent in response to sending the instruction to unmap the first logical extent; sending, by the one or more processors, an instruction to remove the unmapped first logical extent from the higher storage tier; selecting, by the one or more processors, at least one second logical extent located in the lower storage tier for promotion to the higher storage tier; and sending, by the one or more processors, an instruction to relocate the at least one second logical extent from the lower storage tier to the higher storage tier. The at least one second logical extent is selected using a heat map.

In another general embodiment, a computer program product includes a computer readable storage medium having program instructions embodied therewith. The computer readable storage medium is not a transitory signal per se. Moreover, the program instructions readable and/or executable by one or more processors to cause the one or more processors to perform a method which includes: receiving, by the one or more processors, an unmap command, the unmap command identifying a first logical extent located in a higher storage tier of a multi-tiered data storage system having the higher storage tier and a lower storage tier, each storage tier having a plurality of hardware-based data storage devices; sending, by the one or more processors, an instruction to unmap the first logical extent from the higher storage tier; sending, by the one or more processors, an instruction to decrement a heat associated with the unmapped first logical extent in response to sending the instruction to unmap the first logical extent; sending, by the one or more processors, an instruction to remove the unmapped first logical extent from the higher storage tier; selecting, by the one or more processors, at least one second logical extent located in the lower storage tier for promotion to the higher storage tier; and sending, by the one or more processors, an instruction to relocate the at least one second logical extent from the lower storage tier to the higher storage tier. The at least one second logical extent is selected using a heat map.

In yet another general embodiment, a system includes: one or more processors; and logic integrated with the one or more processors, executable by the one or more processors, or integrated with and executable by the one or more processors, the logic being configured to: receive, by the one or more processors, an unmap command, the unmap command identifying a first logical extent located in a higher storage tier of a multi-tiered data storage system having the higher storage tier and a lower storage tier, each storage tier having a plurality of hardware-based data storage devices; send, by the one or more processors, an instruction to unmap the first logical extent from the higher storage tier; send, by the one or more processors, an instruction to decrement a heat associated with the unmapped first logical extent in response to sending the instruction to unmap the first logical extent; send, by the one or more processors, an instruction to remove the unmapped first logical extent from the higher storage tier; select, by the one or more processors, at least one second logical extent located in the lower storage tier for promotion to the higher storage tier; and send, by the one or more processors, an instruction to relocate the at least one second logical extent from the lower storage tier to the higher storage tier. The at least one second logical extent is selected using a heat map.

FIG. 1 illustrates an architecture 100, in accordance with one embodiment. As shown in FIG. 1, a plurality of remote networks 102 are provided including a first remote network 104 and a second remote network 106. A gateway 101 may be coupled between the remote networks 102 and a proximate network 108. In the context of the present architecture 100, the networks 104, 106 may each take any form including, but not limited to a local area network (LAN), a wide area network (WAN) such as the Internet, public switched telephone network (PSTN), internal telephone network, etc.

In use, the gateway 101 serves as an entrance point from the remote networks 102 to the proximate network 108. As such, the gateway 101 may function as a router, which is capable of directing a given packet of data that arrives at the gateway 101, and a switch, which furnishes the actual path in and out of the gateway 101 for a given packet.

Further included is at least one data server 114 coupled to the proximate network 108, and which is accessible from the remote networks 102 via the gateway 101. It should be noted that the data server(s) 114 may include any type of computing device/groupware. Coupled to each data server 114 is a plurality of user devices 116. User devices 116 may also be connected directly through one of the networks 104, 106, 108. Such user devices 116 may include a desktop computer, lap-top computer, hand-held computer, printer or any other type of logic. It should be noted that a user device 111 may also be directly coupled to any of the networks, in one embodiment.

A peripheral 120 or series of peripherals 120, e.g., facsimile machines, printers, networked and/or local storage units or systems, etc., may be coupled to one or more of the networks 104, 106, 108. It should be noted that databases and/or additional components may be utilized with, or integrated into, any type of network element coupled to the networks 104, 106, 108. In the context of the present description, a network element may refer to any component of a network.

According to some approaches, methods and systems described herein may be implemented with and/or on virtual systems and/or systems which emulate one or more other systems, such as a UNIX system which emulates an IBM z/OS environment, a UNIX system which virtually hosts a MICROSOFT WINDOWS environment, a MICROSOFT WINDOWS system which emulates an IBM z/OS environment, etc. This virtualization and/or emulation may be enhanced through the use of VMWARE software, in some embodiments.

In more approaches, one or more networks 104, 106, 108, may represent a cluster of systems commonly referred to as a "cloud." In cloud computing, shared resources, such as processing power, peripherals, software, data, servers, etc., are provided to any system in the cloud in an on-demand relationship, thereby allowing access and distribution of services across many computing systems. Cloud computing typically involves an Internet connection between the systems operating in the cloud, but other techniques of connecting the systems may also be used.

Figure 2:
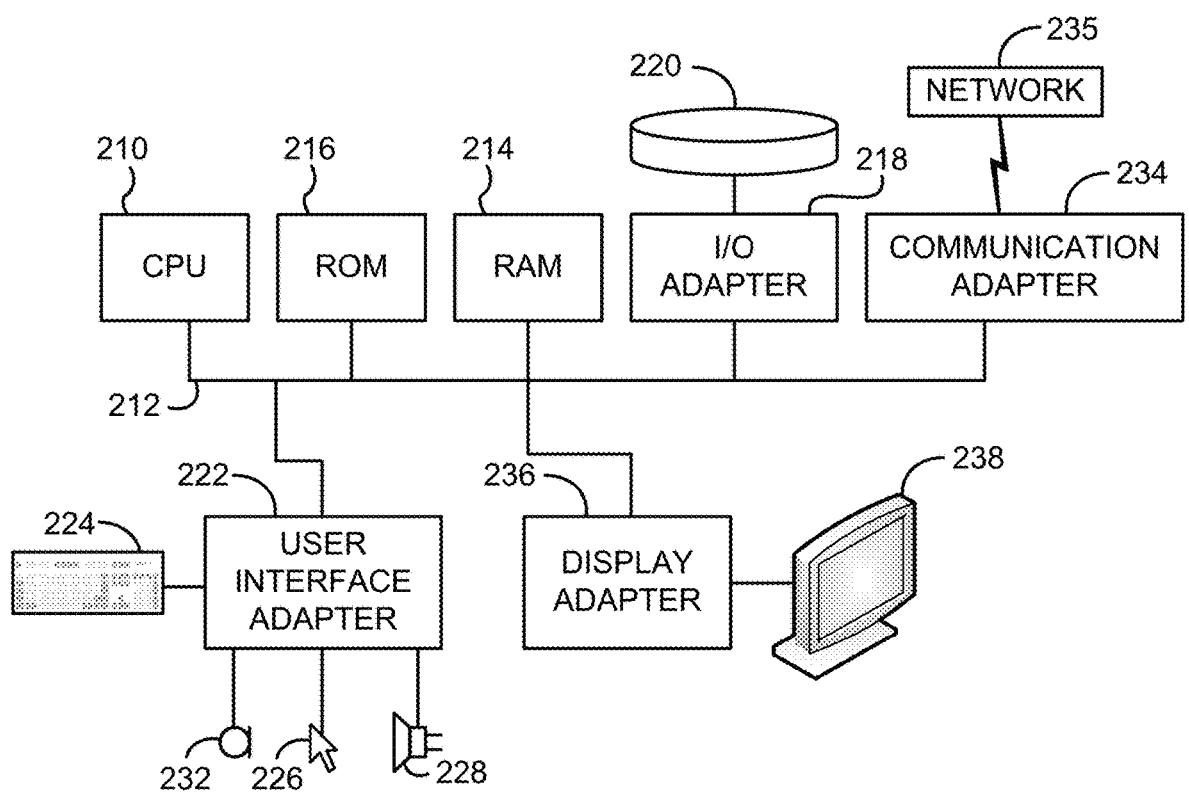
FIG. 2 is a representative hardware environment that may be associated with the servers and/or clients of FIG. 1, in accordance with one embodiment.

FIG. 2 shows a representative hardware environment associated with a user device 116 and/or server 114 of FIG. 1, in accordance with one embodiment. Such figure illustrates a typical hardware configuration of a workstation having a central processing unit 210, such as a microprocessor, and a number of other units interconnected via a system bus 212.

The workstation shown in FIG. 2 includes a Random Access Memory (RAM) 214, Read Only Memory (ROM) 216, an input/output (I/O) adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen and a digital camera (not shown) to the bus 212, communication adapter 234 for connecting the workstation to a communication network 235 (e.g., a data processing network) and a display adapter 236 for connecting the bus 212 to a display device 238.

The workstation may have resident thereon an operating system such as the Microsoft Windows® Operating System (OS), a MAC OS, a UNIX OS, etc. It will be appreciated that a preferred embodiment may also be implemented on platforms and operating systems other than those mentioned. A preferred embodiment may be written using eXtensible Markup Language (XML), C, and/or C++ language, or other programming languages, along with an object oriented programming methodology. Object oriented programming (OOP), which has become increasingly used to develop complex applications, may be used.

Figure 3:
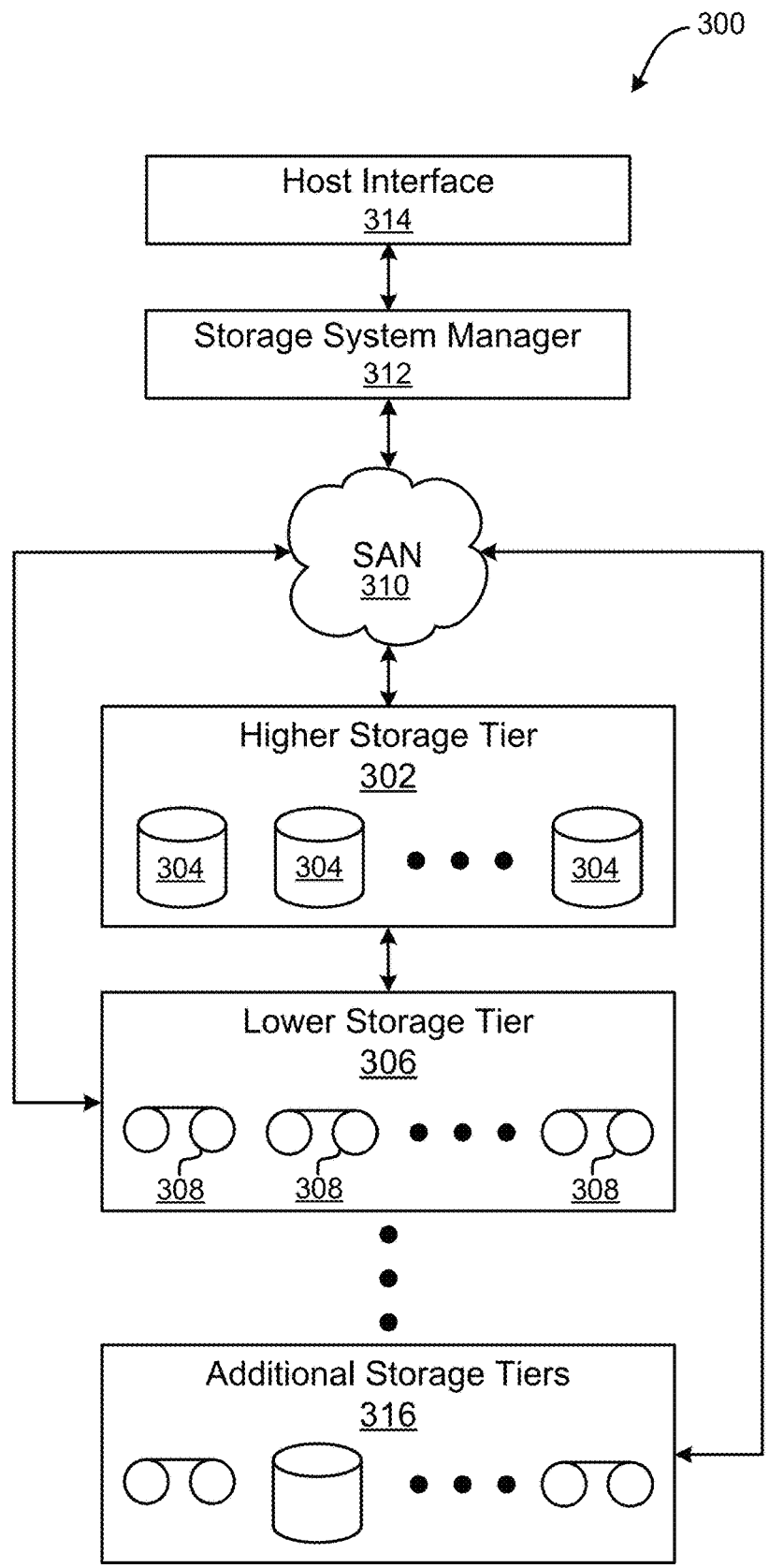
FIG. 3 is a representational view of a multi-tiered data storage system in accordance with one embodiment.

Now referring to FIG. 3, a high level representation of a storage system 300 is shown according to one embodiment. Note that some of the elements shown in FIG. 3 may be implemented as hardware and/or software, according to various embodiments. The storage system 300 may include a storage system manager 312 for communicating with a plurality of media and/or drives on at least one higher storage tier 302 and at least one lower storage tier 306. The higher storage tier(s) 302 preferably may include one or more random access and/or direct access hardware-based data storage devices, e.g., higher storage media 304, such as hard disks in hard disk drives (HDDs), nonvolatile memory (NVM), solid state memory in solid state drives (SSDs), flash memory, SSD arrays, flash memory arrays, etc., and/or others noted herein or known in the art. The lower storage tier(s) 306 may preferably include one or more lower performing hardware-based data storage devices, e.g., lower storage media 308, including sequential access media such as magnetic tape in tape drives and/or optical media, slower accessing HDDs, slower accessing SSDs, etc., and/or others noted herein or known in the art. One or more additional storage tiers 316 may include any combination of storage memory media as desired by a designer of the system 300. Also, any of the higher storage tiers 302 and/or the lower storage tiers 306 may include some combination of storage devices and/or storage media.

The storage system manager 312 may communicate with the drives and/or storage media 304, 308 on the higher storage tier(s) 302 and lower storage tier(s) 306 through a network 310, such as a storage area network (SAN), as shown in FIG. 3, or some other suitable network type. The storage system manager 312 may also communicate with one or more host systems (not shown) through a host interface 314, which may or may not be a part of the storage system manager 312. The storage system manager 312 and/or any other component of the storage system 300 may be implemented in hardware and/or software, and may make use of a processor (not shown) for executing commands of a type known in the art, such as a central processing unit (CPU), a field programmable gate array (FPGA), an application specific integrated circuit (ASIC), etc. Of course, any arrangement of a storage system may be used, as will be apparent to those of skill in the art upon reading the present description.

In more embodiments, the storage system 300 may include any number of data storage tiers, and may include the same or different storage memory media within each storage tier. For example, each data storage tier may include the same type of storage memory media, such as HDDs, SSDs, sequential access media (tape in tape drives, optical disc in optical disc drives, etc.), direct access media (CD-ROM, DVD-ROM, etc.), or any combination of media storage types. In one such configuration, a higher storage tier 302, may include a majority of SSD storage media for storing data in a higher performing storage environment, and remaining storage tiers, including lower storage tier 306 and additional storage tiers 316 may include any combination of SSDs, HDDs, tape drives, etc., for storing data in a lower performing storage environment. In this way, more frequently accessed data, data having a higher priority, data needing to be accessed more quickly, etc., may be stored to the higher storage tier 302, while data not having one of these attributes may be stored to the additional storage tiers 316, including lower storage tier 306. Of course, one of skill in the art, upon reading the present descriptions, may devise many other combinations of storage media types to implement into different storage schemes, according to the embodiments presented herein.

According to some embodiments, the storage system (such as 300) may include logic configured to receive a request to open a data set, logic configured to determine if the requested data set is stored to a lower storage tier 306 of a tiered data storage system 300 in multiple associated portions, logic configured to move each associated portion of the requested data set to a higher storage tier 302 of the tiered data storage system 300, and logic configured to assemble the requested data set on the higher storage tier 302 of the tiered data storage system 300 from the associated portions.

Of course, this logic may be implemented as a method on any device and/or system or as a computer program product, according to various embodiments.

Data storage systems having multiple storage tiers with different performance levels may include additional data management functionality. For instance, a monitoring daemon may be used to orchestrate which storage tier certain data is stored on depending on various factors. Accordingly, FIG. 4 includes another multi-tiered data storage system 400 which is illustrated according to another embodiment. As an option, the present data storage system 400 may be implemented in conjunction with features from any other embodiment listed herein, such as those described with reference to the other FIGS., such as FIG. 3. However, such data storage system 400 and others presented herein may be used in various applications and/or in permutations which may or may not be specifically described in the illustrative embodiments listed herein. Further, the data storage system 400 presented herein may be used in any desired environment. Thus FIG. 4 (and the other FIGS.) may be deemed to include any possible permutation.

Figure 4:
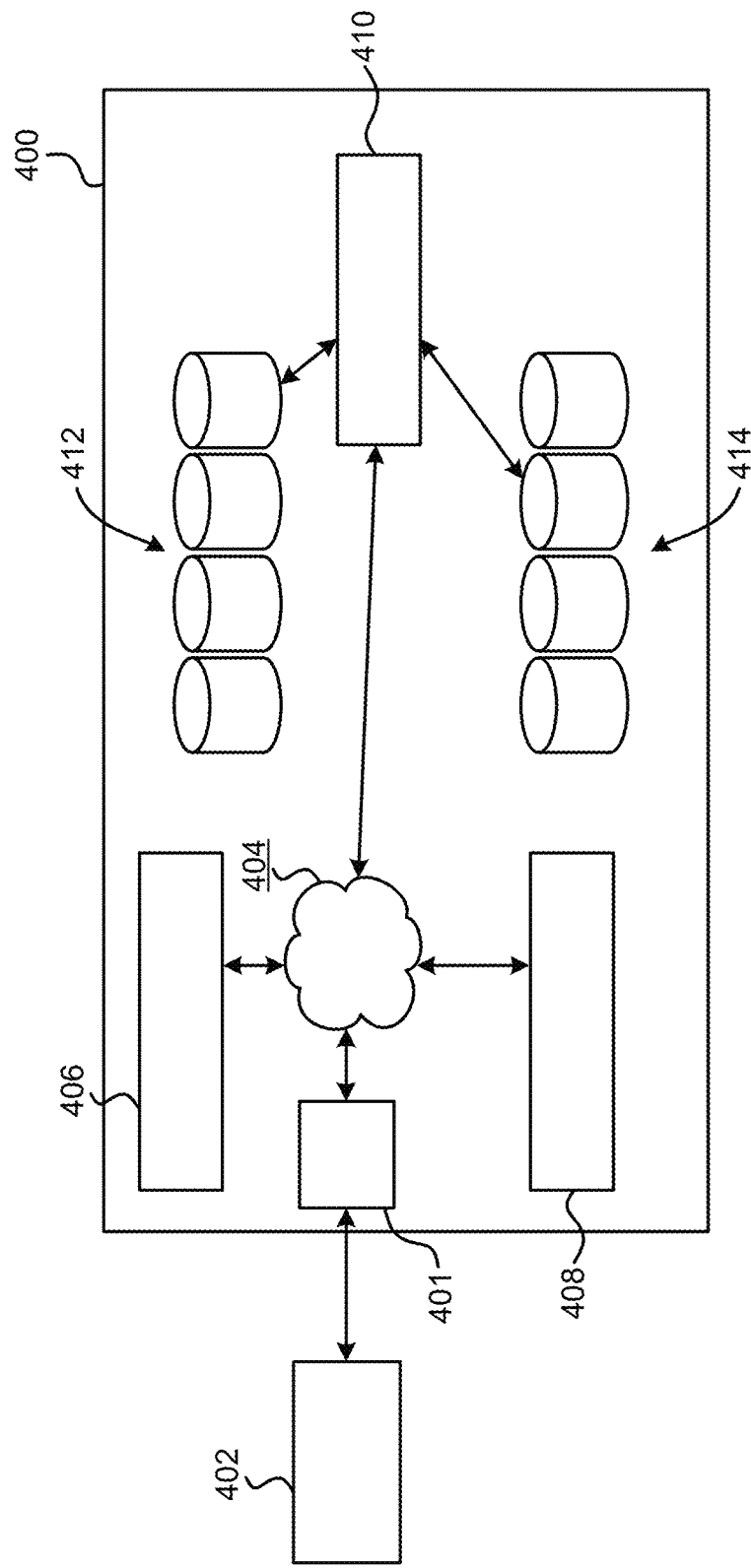
FIG. 4 is a representational view of a multi-tiered data storage system in accordance with one embodiment.

Looking to FIG. 4, the data storage system 400 is shown as being coupled to a host (e.g., user) 402. Although the data storage system 400 is only coupled to one host 402 in the present embodiment, any number of hosts, users, other storage systems, etc. may be coupled to the data storage system 400 depending on the desired approach. Moreover, the host 402 may be coupled to the data storage system 400 using a wireless connection, e.g., WiFi, Bluetooth, a cellular network, etc.; a wired connection, e.g., a cable, a fiber-optic link, a wire, etc.; etc., or any other type of connection which would be apparent to one skilled in the art after reading the present description.

The host 402 may be indirectly coupled to a controller 401 (e.g., a processor) as well as various other components in the data storage system 400 via a network 404. As illustrated, the controller 401 and network 404 may be used to connect the host with a space efficient manager 406, a monitoring daemon 408, a tiering data relocator 410, as well as the data storage tiers 412, 414 themselves. The network 404 may be a SAN, e.g., as described above, but may include any desired type of network depending on the approach. Accordingly, in some embodiments, the controller 401 may process commands (e.g., requests) received from the host 402. For example, an unmap command may be received by the controller 401 from the host 402 whereby the controller 401 may issue a number of requests and/or instructions to the space efficient manager 406, monitoring daemon 408, tiering data relocator 410, and/or any other components of the data storage system 400 using network 404 such that the unmap command may be successfully performed. However, referring momentarily to FIG. 5, a data storage system 500 is shown according to another embodiment in which a central controller (e.g., control module) 502 includes a space efficient manager 406, a monitoring daemon 408, and a tiering data relocator 410 included therein. It should be noted that FIG. 5 illustrates a variation of the embodiment of FIG. 4 and therefore, various components of FIG. 5 have common numbering with those of FIG. 4.

According to some approaches, any one or more of the space efficient manager 406, monitoring daemon 408, and tiering data relocator 410 may be implemented logically in the central controller 502, e.g., in software. However, in other approaches, any one or more of the space efficient manager 406, monitoring daemon 408, and tiering data relocator 410 may be implemented as a unique component included in the central controller 502 itself. Accordingly, depending on the desired embodiment, a controller (e.g., controller 401 or central controller 502) may perform directions, requests, operations, etc. received from the host 402 by sending instructions to one or more of the space efficient manager 406, monitoring daemon 408, and tiering data relocator 410 using a network connection, internal circuitry of the controller, or any other process which would be apparent to one skilled in the art after reading the present description.

Figure 5:
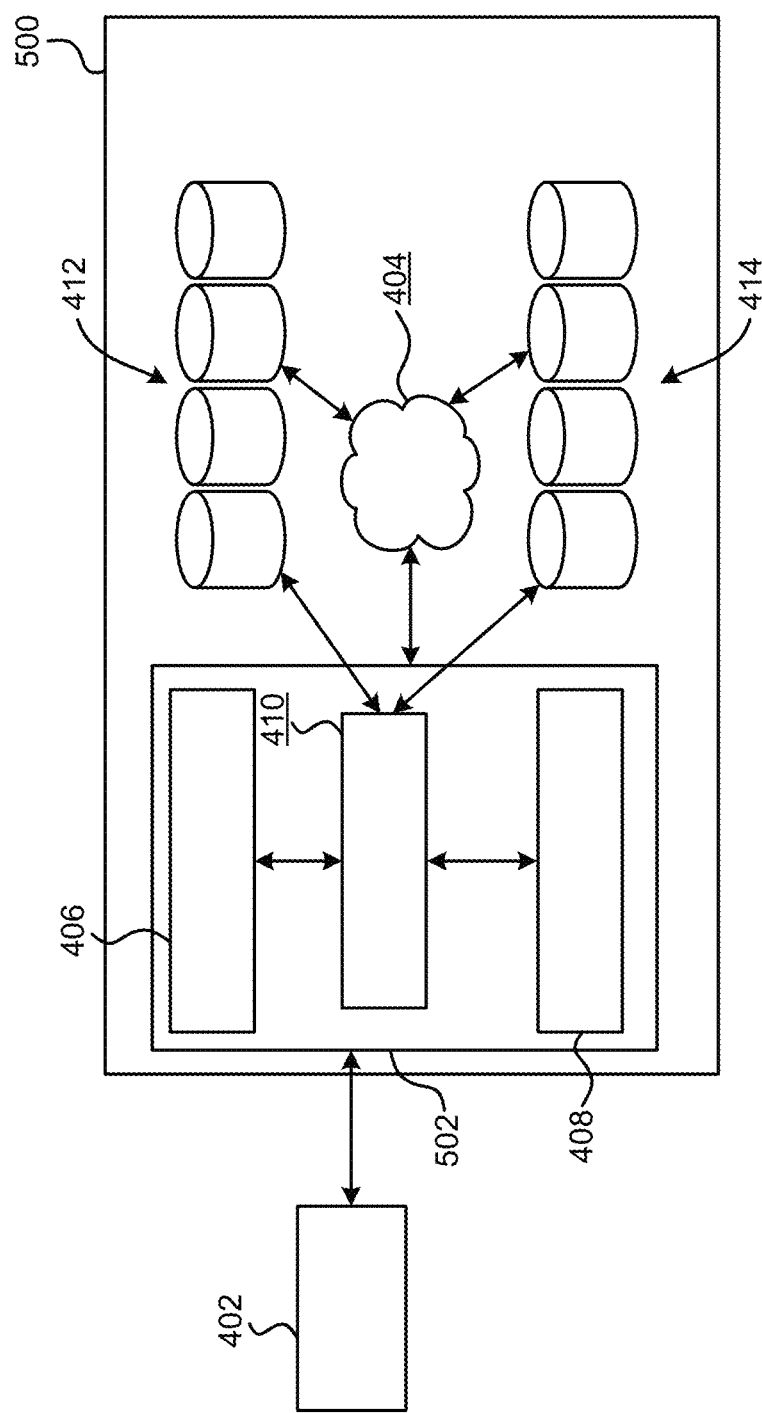
FIG. 5 is a representational view of a multi-tiered data storage system in accordance with one embodiment

Referring still to FIG. 5, each of the space efficient manager 406, monitoring daemon 408, and tiering data relocator 410 may be able to communicate with each other. For instance, communication between space efficient manager 406 and tiering data relocator 410 located within the same controller 502 may be achieved by passing information across layers programmatically. According to one example, a DS8000 may implement a mechanism to communicate heat map(s) from one storage system to another. This may be implemented to ensure that specific data is stored in certain storage tiers. Moreover, similar implementations may be used when reserved fields of write command descriptor blocks are used to communicate this information, e.g., as would be appreciated by one skilled in the art after reading the present description. However, communication between space efficient manager 406 and tiering data relocator 410 when not located within the same controller (e.g., as seen in FIG. 4) may be achieved using out-of-band protocol.

Data storage tiers 412, 414 as illustrated in FIG. 5 may also be able to communicate with the controller 502 and/or any of the components included therein using a connection with network 404. However, tiering data relocator 410 may be able to communicate directly with either of the data storage tiers 412, 414.

Referring again to FIG. 4, the space efficient manager 406 may be used to receive and/or process requests from the host 402, in addition to communicating with the other components included in the data storage system 400. For example, the space efficient manager 406 may receive a read request from the host 402, whereby the space efficient manager 406 may send a request to the data storage tiers 412, 414 for the data corresponding to the read request, and ultimately return the requested data to the host 402. It follows that the various components included in the data storage system 400 may communicate with each other depending on the approach, e.g., send data to, issue requests to, receive information from, etc. each other.

As alluded to above, each of the data storage tiers 412, 414 of data storage system 400 may have a plurality of hardware-based data storage devices having different performance characteristics (e.g., levels) associated therewith. For instance, data storage tier 412 may be considered a "higher" or "faster" data storage tier, while data storage tier 414 is considered a "lower" or "slower" data storage tier. It should be noted that the terms "higher" and "lower" are intended to be in relation to each other. Thus, characteristically hardware-based data storage devices in the higher data storage tier 412 may have quicker data access times, reduced latency, etc. in relation to hardware-based data storage devices in the lower data storage tier 414. According to an exemplary approach, which is in no way intended to limit the invention, the higher data storage tier 412 may include a SSD based storage medium, while the lower data storage tier 414 may include an HDD based storage medium. In multi-tiered storage systems, it is preferred that at least two data storage tiers are available, where each of the tiers has a different level of relative performance.

Accordingly, the difference in performance between the higher and lower storage tiers 412, 414 may desirably be utilized improve data storage. For instance, monitoring daemon 408 may be used to manage the physical storage location of different data depending on its frequency of use, user input, sensitivity of the data, etc. For example, data that is frequently accessed by an application that is response time sensitive might be stored on SSD, while data that is infrequently accessed and for which a higher response time is more tolerable might be stored on HDD or magnetic tape. Moreover, the tiering data relocator 410 may be used to actually manage, coordinate, cause, etc., the relocation of data from one of the data storage tiers to the other, e.g., according to any one of the various approaches described herein. In other words, the tiering data relocator 410 may be able to (e.g., configured to) manage, coordinate, cause, etc., the relocation of at least one logical extent from one or more of the hardware-based data storage devices in a lower storage tier (in which the at least one logical extent is stored), to one or more of the hardware-based data storage devices in the higher storage tier, or vice versa.

The cost per unit (e.g., Gigabyte) of storage is typically higher for higher performing (e.g., faster) memory than it is for relatively lower performing memory. Thus, the capacity of a higher data storage tier is typically smaller than the capacity of a lower data storage tier. In order to maintain an efficient use of the higher performing, yet typically smaller, data storage tier, algorithms may be implemented to relocate data based on a temperature associated therewith. For example, "hotter" data may be migrated towards the higher storage tier (e.g., promoted), while "colder" data is migrated towards the slower tier (e.g., demoted). In the present context, the heat (e.g., "hotter" and "colder") of data refers to the rate (e.g., frequency) at which the data is updated. Memory blocks that are considered "hot" or "hotter" tend to have a frequent updated rate, while memory blocks that are considered "cold" or "colder" have an update rate which is at least slower than that of hot blocks. However, additional factors may be incorporated into the determination of the relative heat of a given portion of data, e.g., such as read frequency. It follows that this promotion and demotion process of data actually relocates the data from one tier to another, and may even be performed without the knowledge of an application that is running.

For storage systems, there are two main types of volumes which are based on storage space allocation. The first type includes "fully allocated volumes" (thick provisioned), while the second type includes "space efficient volumes" (thin provisioned). In thick provisioned volumes, the physical space for the volume is pre-allocated when the volume is created. Space efficient volumes on the other hand, are volumes for which physical space is allocated (and associated with virtual address space) when it is used by an application. Furthermore, a space efficient volume is often created with full virtual capacity (e.g., provided by a user), but physical allocation happens at the time a write operation is performed to a give region. At the time a write command is issued by a host application or internal system, storage space involved with performing the write operation is allocated and mapped to virtual address space, and data is written to the volume. This storage space allocation is transparent to the user and hence users may be unaware of this dynamic physical space allocation.

When a space efficient volume is used in a multi-tiered data storage system, different extents (e.g., portions) of the space efficient volume may be stored on different tiers of the storage system, e.g., based on an access frequency of each respective extent. However, the manner in which conventional products have performed delete operations has caused such conventional products to be ignorant as to which sectors (pages) in memory are truly in use, and which can be considered free (e.g., allocable) space. For instance, even if a portion of memory is deallocated in a conventional product, this deallocation is not known to a tiering application until the data in the portion of memory gradually becomes "cold" enough that it is worthy of being demoted during a future tiering management cycle, which may not occur until a significant amount of time has passed. This setback suspends portions of data from being relocated to an appropriate tier of memory, thereby limiting efficiency of the data storage system. As a result, the data may unnecessarily occupy the portion of memory on the higher tier before it is removed. Additionally, even after the data eventually becomes cold, the demotion process in conventional products requires a copy operation to unnecessarily be performed, even if the data is unmapped and no longer in use.

As a result, when a portion of memory on a faster tier in a conventional product is unmapped (e.g., because data on that portion of memory is no longer required), the portion of memory continues to appear as being "hot" and thereby occupies space on the higher cost, faster tier or memory, even if the data in the portion of memory is not being used anymore. This can prevent other data that is actually hot from being promoted in future tiering cycles. Moreover, if the tiering cycle time is large, then this conventional shortcoming may block other data from being promoted to faster tiers of memory, thereby resulting in lower performance, and ultimately improper utilization of tiered memory in conventional products.

In sharp contrast to these conventional shortcomings, various embodiments described herein include a process of relocating or discarding extents as soon as they are trimmed. As a result, the promotion of other data extents to the faster tier is enabled, thereby improving performance of the storage system, e.g., as will be described in further detail below.

Figure 6:
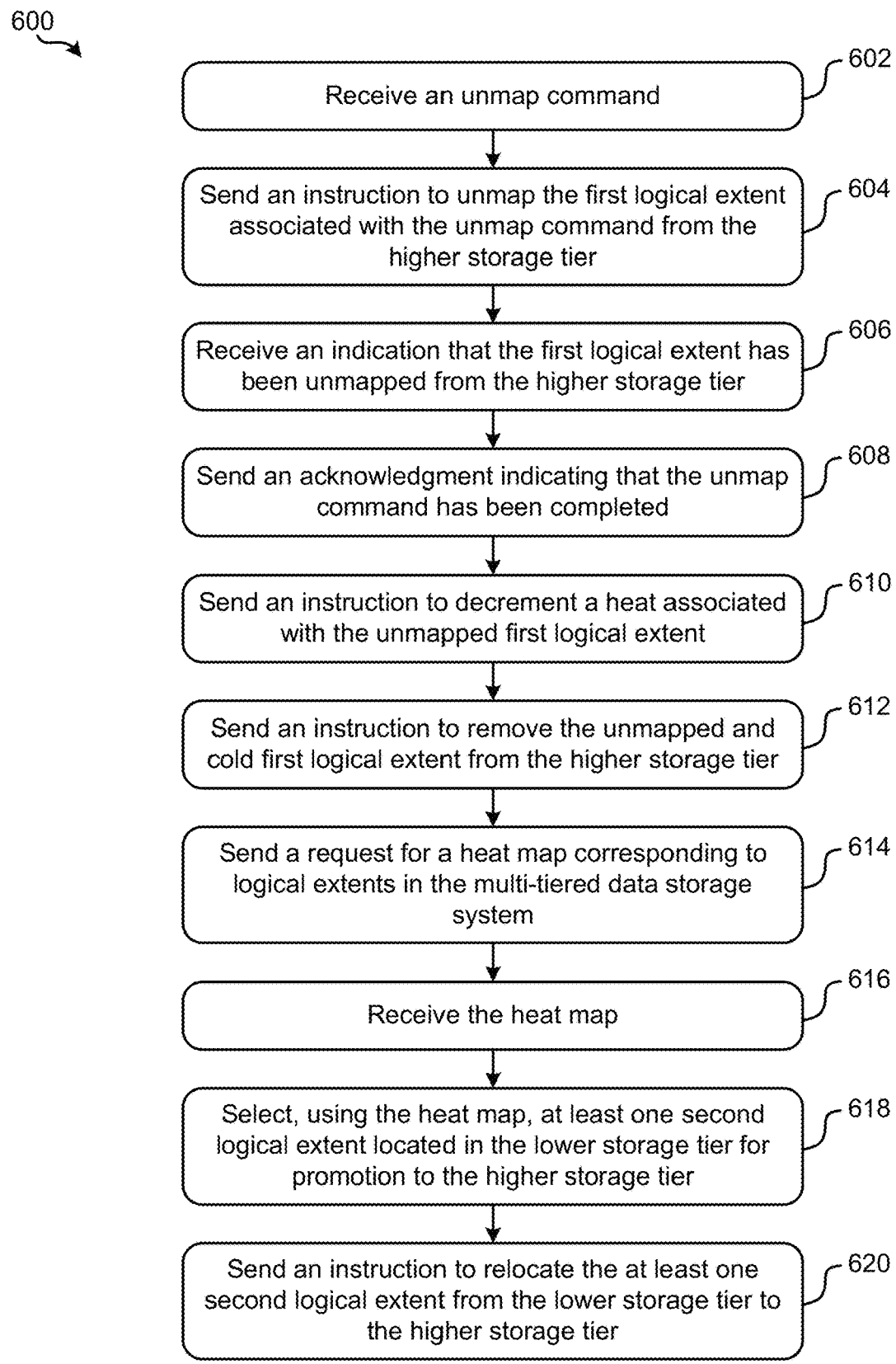
FIG. 6 is a flowchart of a method in accordance with one embodiment.

Now referring to FIG. 6, a flowchart of a computer-implemented method 600 is shown according to one embodiment. The method 600 may be performed in accordance with the present invention in any of the environments depicted in FIGS. 1-5, among others, in various embodiments. Of course, more or less operations than those specifically described in FIG. 6 may be included in method 600, as would be understood by one of skill in the art upon reading the present descriptions.

Each of the steps of the method 600 may be performed by any suitable component of the operating environment. For example, any one or more of the processes described in method 600 may be performed by controller 401 of FIG. 4, or central controller 502 of FIG. 5. However, in various embodiments, the method 600 may be partially or entirely performed by a controller, a processor, etc., or some other device having one or more processors therein. The processor, e.g., processing circuit(s), chip(s), and/or module(s) implemented in hardware and/or software, and preferably having at least one hardware component may be utilized in any device to perform one or more steps of the method 600. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 6, operation 602 of method 600 includes receiving an unmap command. Depending on the approach, the unmap command may be received from a host, a user, a controller in another storage system, etc. As would be appreciated by one skilled in the art, an unmap command may be included in the Small Computer System Interface (SCSI) command set, and allows an operating system to inform memory (e.g., a SSD) which portions of data are no longer considered in use and can be wiped internally. Accordingly, in some approaches, operation 602 may similarly include receiving a trim command, e.g., as included in the ATA command set.

The unmap command may correspond to data that is stored in a multi-tiered data storage system, e.g., such as those illustrated in FIGS. 4-5 above. Accordingly, the unmap command may identify a first logical extent located in a higher storage tier of a multi-tiered data storage system having the higher storage tier having a plurality of higher performing hardware-based data storage devices (e.g., SSD), and a lower storage tier having a plurality of lower performing hardware-based data storage devices (e.g., HDD) at least relative to the higher performing hardware-based data storage devices. Depending on the particular approach, the logical extent identified may no longer be needed by the host for a various number of reasons. Moreover, the first logical extent may be part of a space efficient volume, and may therefore be thin provisioned.

An unmap (or similar) command may be received in situations where an entire file is deleted which the data in one or more logical extents corresponds to, certain contents of a given file are deleted, a virtual machine is migrated from one physical location to another physical location having different storage settings, etc.

Moreover, in some approaches, the first logical extent associated with the unmap command may be identified in a list of extents being unmapped from a given volume by the received unmap command. It follows that more than one logical extent may be unmapped at a time, and accordingly, any one or more of the operations described in method 600 may be performed for more than one logical extent. According to an exemplary approach, which is in no way intended to limit the invention, once the unmap command is received by a controller of the storage system, a controller may instruct a space efficient manager in the storage system to fetch a list of logical extents being unmapped from the volume by the received unmap command. Once the list of extents is fetched (e.g., determined), communication may be made to the other components of the storage system to actually perform the unmapping of these identified extents.

Operation 604 includes sending an instruction to unmap the first logical extent associated with (identified in) the unmap command from the higher storage tier. According to an illustrative approach, the unmap command is an advisory SCSI command which may be used to reclaim space from memory (SSD) that has been deleted, e.g., by a host operating system, an application, a virtual machine, etc. Thus, an unmap command may be used to achieve improved storage utilization, flexible capacity planning, ongoing storage provisioning service, etc. However, it should be noted that a similar instruction may be sent to the memory storing the first logical extent in approaches where the higher storage tier does not include SSD, e.g., as would be appreciated by one skilled in the art after reading the present description.

According to one approach, the instruction to unmap the first logical extent may be sent to a space efficient manager (e.g., see 406 from FIGS. 4-5 above). However, instruction(s) to unmap the first logical extent and/or other logical extents may be sent to any desired logical or physical component in a multi-tiered data storage system depending on the desired approach. Thus, in some approaches operation 604 may include sending instructions indicating that the first logical extent should be unmapped.

Operation 606 includes receiving an indication that the first logical extent has been unmapped from the higher storage tier. As mentioned above, an instruction to unmap the first logical extent may be sent to a space efficient manager. Thus, in some approaches the indication received in operation 606 may be received from the space efficient manager. Moreover, the indication may be received automatically in response to the unmap instruction being completed, in response to an inquiry sent to the space efficient manager, deduced after an amount of time has passed since the instruction was sent in operation 604, etc., depending on the desired embodiment. Moreover, operation 608 includes sending an acknowledgment to the host indicating that the unmap command has been completed. This operation may be desirable in some approaches where the host is able to perform additional operations once the unmap command has been performed, e.g., as would be appreciated by one skilled in the art after reading the present description.

Referring still to FIG. 6, operation 610 includes sending an instruction to decrement a heat associated with the unmapped first logical extent in response to sending the instruction to unmap the first logical extent. As described above, conventional products are faced with poor performance which results from an inability to update storage tiers after data has been unmapped. It is noted that in sharp contrast, operation 610 includes sending an instruction to decrement a heat associated with the unmapped first logical extent irrespective of (e.g., without evaluating) the current heat associated with the first logical extent, and ideally immediately following receiving the indication that the first logical extent has been unmapped from the higher storage tier and/or sending the acknowledgment to the host.

The instruction to decrement a heat associated with the unmapped first logical extent may be sent to a monitoring daemon, e.g., such as an Easy Tier® monitoring daemon. According to such approaches, the monitoring daemon may, upon receiving the instruction, decrement a heat counter corresponding to the first logical extent and/or the data included therein. Depending on the style and type of heat counter employed, in an exemplary approach, which is in no way intended to limit the invention, the monitoring daemon may decrement a heat counter corresponding to the logical extent to a lowest possible value (e.g., zero) to indicate that the logical extent and/or data included therein may have a coldest possible heat associated therewith.

After the instruction to decrement a heat associated with the unmapped first logical extent has been sent, and preferably performed (e.g., by the monitoring daemon), operation 612 includes sending an instruction to remove the unmapped and cold first logical extent from the higher storage tier. By proactively instructing the heat associated with the unmapped logical extent to be decreased, the logical extent may be removed from the higher storage tier significantly sooner than possible in conventional products. Again, conventional products must wait until deallocated portions of memory gradually become colder over time, and only after a significant amount of time has passed can these portions of memory even be moved from a particular location. Accordingly, by implementing various ones of the novel processes described herein, the shortcomings experienced in conventional products are desirably overcome.

Figure 7:
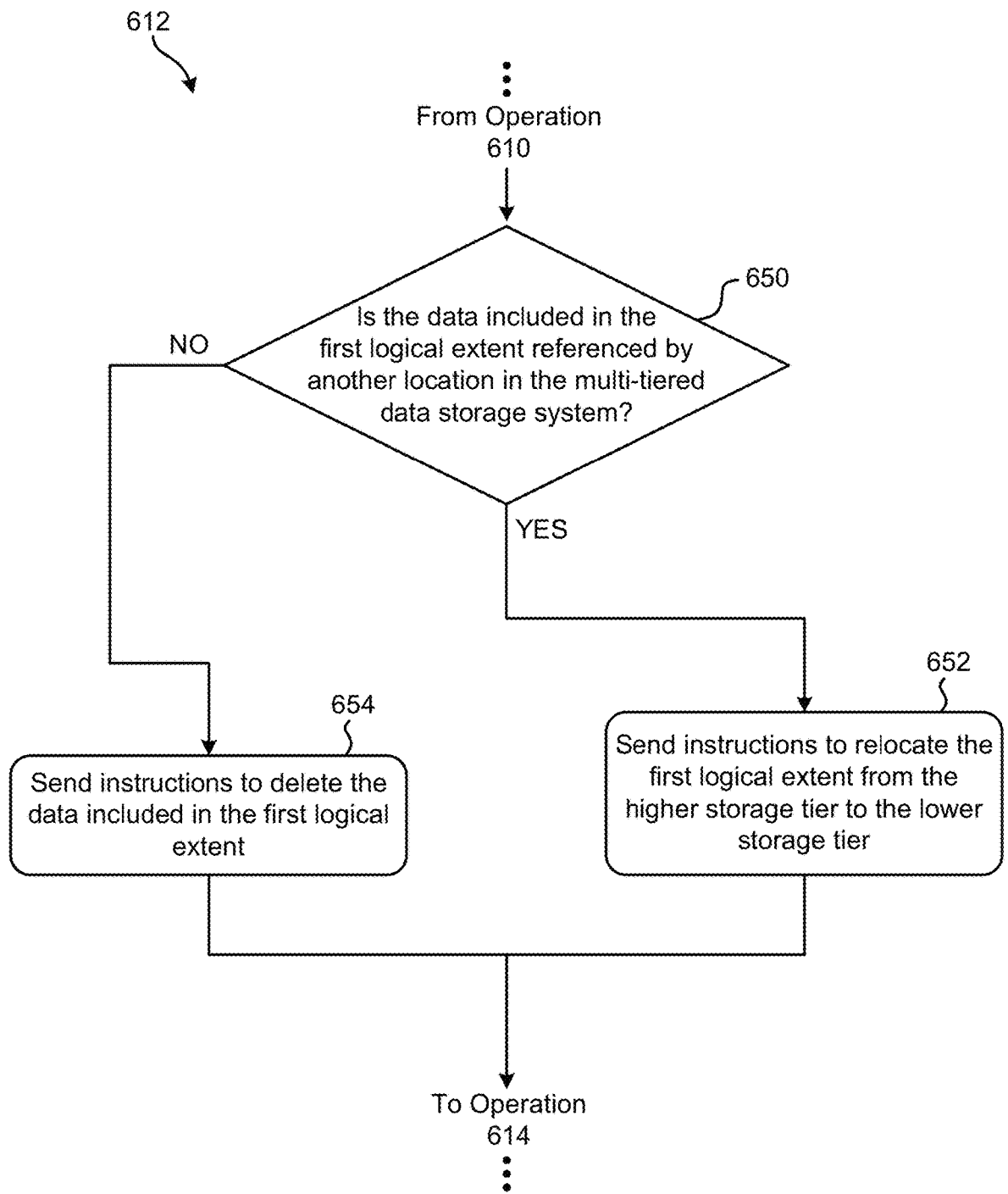
FIG. 7 is a flowchart of sub-processes associated with performing one of the operations in FIG. 6.

Referring momentarily to FIG. 7, exemplary sub-operations of sending an instruction to remove the unmapped and cold first logical extent from the higher storage tier are illustrated in accordance with one embodiment, one or more of which may be used to perform operation 612 of FIG. 6. However, it should be noted that the sub-operations of FIG. 7 are illustrated in accordance with one embodiment which is in no way intended to limit the invention.

As shown, the flowchart of FIG. 7 opens with performing a decision as to whether the data included in the first logical extent is referenced by another location in the multi-tiered data storage system. See decision 650. In other words, decision 650 includes determining whether the data included in the first logical extent has a pointer pointing thereto, is shared by another volume, etc.

In response to determining that the data included in the first logical extent is referenced by another location in the multi-tiered data storage system, the flowchart proceeds to sub-operation 652 which includes sending instructions to relocate (e.g., demote) the first logical extent from the higher storage tier to the lower storage tier. It is preferred that the data included in the first logical extent is demoted rather than simply deleted as a result of performing the unmap command, because it has been determined in this situation that the data is referenced (e.g., relied on) by another location in memory. Accordingly, if the data included in the first logical extent were to be deleted, the other location in memory referencing that data and/or the storage system as a whole may experience data loss, data corruption, etc. Moreover in some approaches a multi-tiered storage system may have more than two tiers of memory (e.g., as seen in FIG. 3). Accordingly, sub-operation 652 may include demoting the first logical extent from the higher storage tier to a storage tier which has at least a lower performance level than the storage tier the data is being demoted from.

Once sub-operation 652 has been performed, FIG. 7 shows the flowchart proceeding directly to operation 614 of FIG. 6, e.g., as will be described in further detail below. However, returning to decision 650, the flowchart proceeds to sub-operation 654 in response to determining that the data included in the first logical extent is not referenced by another location in the multi-tiered data storage system. There, sub-operation 654 includes sending instructions to delete the data included in the first logical extent. As described above, if the data is not referenced (e.g., relied on) by any other location in the storage system, it can be deleted without causing any issues with the remainder of the data stored in the storage system. Once sub-operation 654 has been performed, FIG. 7 shows the flowchart again proceeding directly to operation 614 of FIG. 6.

It should be noted that in some approaches, more than one logical extent may be identified to be unmapped in operation 602. Thus, the processes illustrated in FIG. 7 may be performed in a repetitive (e.g., iterative) fashion for each of the logical extents that are to be unmapped, e.g., as would be appreciated by one skilled in the art after reading the present description. Moreover, it should be noted that decision 650 may ignore the other logical extents when determining whether the data included in a given one of the logical extents is referenced by another location in the multi-tiered data storage system, as each of the logical extents associated with the unmap command will be either deleted or demoted. However, in other approaches, decision 650 may ignore the other logical extents associated with the unmap command in order to maintain any data reference chains. For example, a logical extent not associated with the unmap command may have a pointer to data included in a logical extent associated with the unmap command, which may in turn have a pointer to data included in another logical extent associated with the unmap command.

Once the first logical extent has been deleted and/or demoted from the higher storage tier, the amount of data stored in the higher storage tier essentially shrinks, thereby creating free space on the higher storage tier available for other data to be stored in. In view of the efficient performance associated therewith, it is preferred that the higher storage tier is taken full advantage of. In other words, when space is available in the higher storage tier, it is preferred that it is filled with hot data. Accordingly, referring again to FIG. 6, operation 614 includes sending a request for a heat map corresponding to logical extents in the multi-tiered data storage system.

In operation 616, a heat map is desirably received. In preferred approaches, the heat map is received from a data process analyzer (DPA) which is responsible for maintaining one or more heat maps for various storage tiers, volumes, portions of data, etc. Moreover, depending on the approach, the heat map received may be an existing heat map, or a heat map that has been updated since the first logical extent was removed from the higher storage tier. Furthermore, in some approaches the heat map may be received from the monitoring daemon described above, e.g., where the monitoring daemon may be responsible for maintaining (e.g., monitoring) heat values corresponding to each of the respective logical extents and/or the data stored in each of the respective logical extents. As previously mentioned, heat values may be at least somewhat related to access counters which correspond to an access rate of the data in the respective logical extents. Moreover, the heat values may be represented as numerical flags which may be stored in lookup tables. It follows that the heat map is preferably updated regularly in order to keep up with changes in access rates for the various logical extents.

Referring still to FIG. 6, operation 618 includes selecting, using the heat map, at least one second logical extent located in the lower storage tier for promotion to the higher storage tier. In other words, operation 618 includes selecting at least one second logical extent in the lower storage tier as a candidate to be promoted (e.g., a "promotion candidate") to the higher storage tier. Moreover, the number of extent candidates selected may be equal to or less than the number of extents that have been removed from the higher storage tier. The specific number of extent candidates selected may vary depending on the number of hot extents on the lower storage tier, the amount of available space on the higher tier, user preference, etc.

The second logical extent selected preferably has a hot temperature corresponding thereto, or at least the hottest temperature of the extents in the lower storage tier. By selecting a second logical extent having a hottest temperature in the lower storage tier, the free space on the higher storage tier will be efficiently used, e.g., compared to using it to store a logical extent having a medium temperature corresponding thereto. However, in other approaches the logical extent expected to have a hottest upcoming temperature in the near future may be promoted, thereby resulting in the promotion candidate being selected by anticipated use, which is in no way intended to limit the invention.

In order to select one or more second extents (depending on the number and/or size of the logical extent(s) removed from the higher storage tier) from the lower storage tier having a hottest temperature, method 600 may additionally perform an optional operation (not shown) which includes ordering (e.g., arranging) the logical extents based on their respective heats. This may allow for a better representation of the relative heat of each of the logical extents in the storage tiers lower than the higher storage tier which in turn may make the selection in operation 618 more accurate.

Further still, operation 620 includes sending an instruction to relocate (e.g., promote) the at least one second logical extent from the lower storage tier to the higher storage tier. In other words, the at least one second logical extent selected in operation 618 may be promoted from the lower storage tier to take the place of the demoted unmapped first logical extent. According to some approaches, the instruction to relocate the at least one second logical extent from the lower storage tier to the higher storage tier may be sent to a tiering data relocator (e.g., see 410 of FIGS. 4-5) which may be able to physically transition the at least one logical extent and the data stored therein from the lower storage tier (e.g., HDD) to the higher storage tier (e.g., SSD). It follows that the instruction sent in operation 620 may be performed by rewriting the data in the second logical extent into the higher storage tier, and deleting the data from the lower storage tier.

It should again be noted that in some approaches, more than one logical extent may be unmapped at a time, and accordingly, any one or more of the operations described in method 600 may be repeated in an iterative fashion for more than one logical extent. Accordingly, any one or more of the operations included in FIG. 6 may loop back on themselves and be repeated for each of the more than one logical extent corresponding to an unmap command received.

Furthermore, although the operations described in method 600 are described in relation to a two tiered data storage system having a higher storage tier and a lower storage tier, any one or more of the operations may be implemented in a storage system having more than two different storage tiers. For example, extents may be promoted, demoted, deleted, etc. between and/or from any number of storage tiers, e.g., see FIGS. 9A-9C below.

Figure 8A:
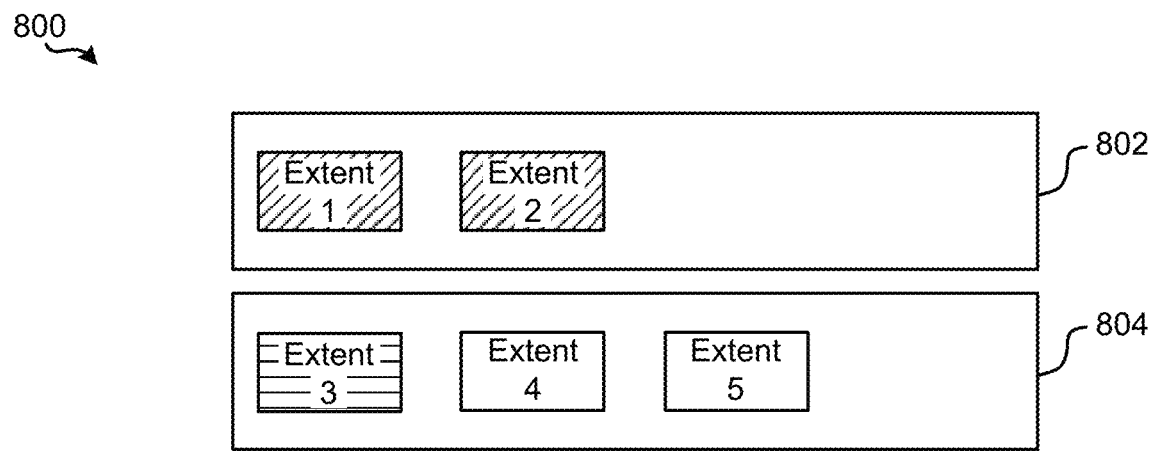
FIGS. 8A-8B is a partial representational view of a two tiered data storage system in accordance with one in-use embodiment.
Figure 8B:
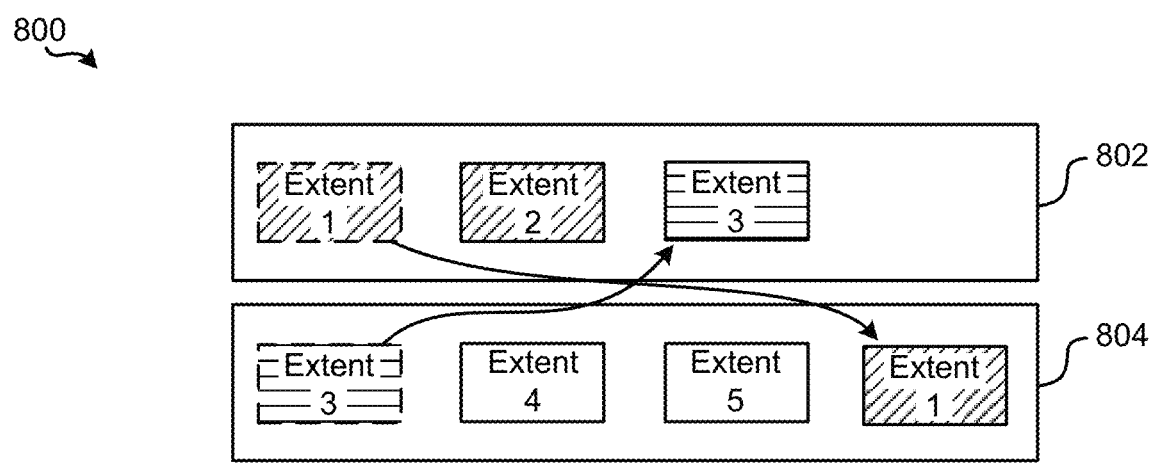

Looking to FIGS. 8A-8B, an in-use example is illustrated in accordance with a two tiered data storage system 800, which is in no way intended to limit the invention, but rather is presented by way of example.

As shown in FIG. 8A, the two tiered data storage system 800 includes a higher storage tier 802 and a lower storage tier 804, which include SSD and HDD respectively. The higher storage tier 802 is shown as desirably including hot data (represented by diagonal hatching) in each of the logical extents Extent 1, Extent 2 included therein. Moreover, the lower storage tier 804 includes an extent Extent 3 having moderately hot, e.g., very warm data (represented by horizontal hatching) as well as extents Extent 4, Extent 5 having cold data stored therein.

Moving now to FIG. 8B, the two tiered data storage system 800 is illustrated after an unmap command has been received and performed for Extent 1. After the unmap command is received by the storage system 800, the heat associated with Extent 1 is decremented to a cold value irrespective of the fact that Extent 1 had a hot temperature associated therewith. It is also preferably determined whether the data included in Extent 1 is referenced by any other locations in the storage system 800. According to the present in-use example, Extent 1 was removed from the higher storage tier 802 and demoted to the lower storage tier 804 in response to determining that the data included therein was referenced by another location in the storage system 800.

The act of demoting Extent 1 from the higher storage tier 802 to the lower storage tier 804 creates free space in the higher storage tier 802 which may be filled with an alternative extent. Accordingly, an extent in the lower storage tier 804 having a hottest temperature associated therewith Extent 3 is promoted from the lower storage tier 804 to the higher storage tier 802. This results in not only an efficient removal of the unmapped extent Extent 1 from the higher storage tier 802, but also an efficient use of the free space in the higher storage tier 802 after the removal of Extent 1 therefrom.

Figure 9A:
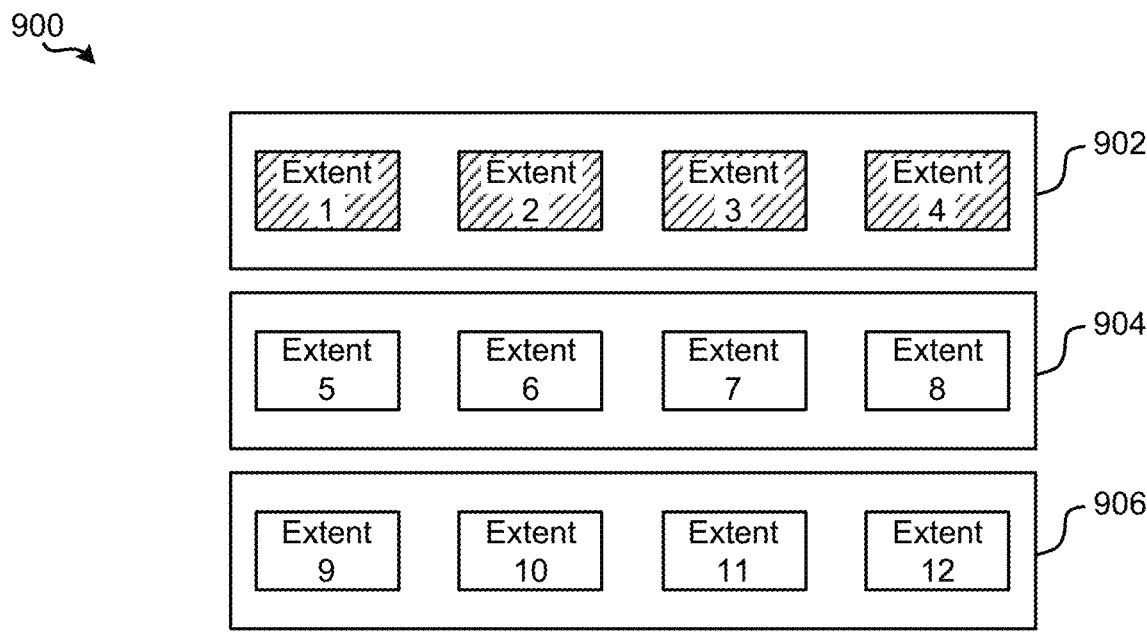
FIGS. 9A-9C is a partial representational view of a three tiered data storage system in accordance with one in-use embodiment.
Figure 9B:
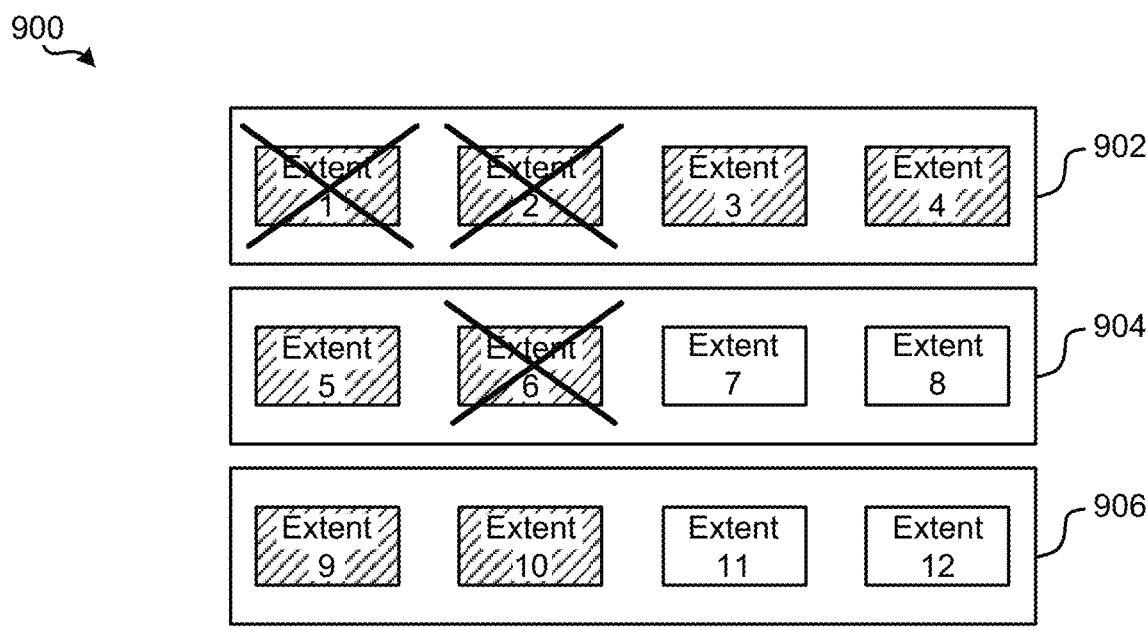
Figure 9C:
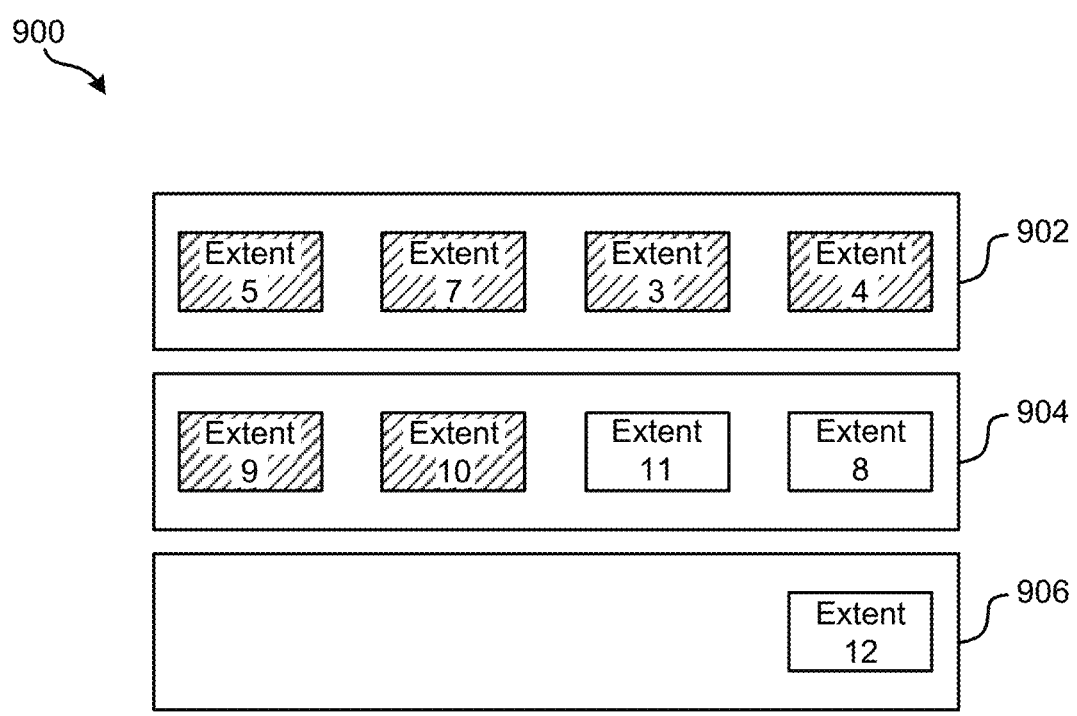

Looking now to FIGS. 9A-9C, an in-use example is illustrated in accordance with a three tiered data storage system 900, which is in no way intended to limit the invention, but rather is presented by way of example.

As shown in FIG. 9A, the two tiered data storage system 900 includes a higher storage tier 902, a middle storage tier 904, and a lower storage tier 906, which include SSD, HDD, and magnetic tape respectively. The higher storage tier 902 desirably includes hot data (represented by diagonal hatching) in each of the logical extents Extent 1-Extent 4 included therein. The middle storage tier 904 includes a mixture of hot and warm data in the logical extents Extent 5-Extent 8 stored therein, and the lower storage tier 906 includes extents Extent 9-Extent 12 having cold data as well as data that has recently become hot. It follows that it is desirable that Extent 5, Extent 6, Extent 9 and Extent 10 be promoted to a higher performing storage tier than the one they currently reside on in view of their respective temperatures.

Moving to FIG. 9B, upon receiving an unmap command for Extent 1, Extent 2 and Extent 6, the data storage system 900 preferably determines whether the data included in any of these extents is referenced (relied on) elsewhere in the data storage system 900. Moreover, FIG. 9C shows that each of Extent 1, Extent 2 and Extent 6 have been deleted in response to determining that the data included therein is not referenced elsewhere in the data storage system 900. The space freed in the higher storage tier 902 and the middle storage tier 904 have also been filled with extents from lower storage tiers. For instance, Extent 5 and Extent 7 include hot data and have been promoted from the middle storage tier 904 to the higher storage tier 902. Similarly, Extent 9 and Extent 10 include hot data as well and have been promoted from the lower storage tier 906 to the middle storage tier 904. Further still, Extent 11 has been promoted from the lower storage tier 906 to the middle storage tier 904 in order to take advantage of the improved performance (e.g., higher throughput, lower access times, reduced latency, etc.) of the middle storage tier 904 with respect to the lower storage tier 906. As a result, overall performance of the three tiered data storage system 900 is improved by efficiently removing unmapped extents, and desirably utilizing the resulting free space, e.g., as described herein.

It follows that various embodiments described herein are able to provide efficient data management of high performance tiers in multi-tier storage architectures by making the storage architecture (e.g., storage system) aware of data block deallocation activity during the unmap process. As described above, at the time a space efficient volume is being unmapped, the space efficient volume extents that are in higher storage tier and which have been unmapped are marked as being cold while other hot extents may be promoted to the higher storage tier immediately following the unmap operation has been completed.

By implementing such embodiments as those described herein, various improvements may desirably be achieved. For instance, storage systems implementing various ones of the processes described herein experience improved performance, because deserving extents (hotter extents on a lower storage tier) are promoted after other extents are unmapped from the higher storage tier. Specifically, storage systems will experience improved application performance when accessing the data which has been promoted to the higher tier.

Moreover, these improvements may be achieved without using any additional space and using existing space already available in the storage system. The number of copy operations may also be reduced while data is being migrated from a higher tier to a lower tier, or vice-versa in a multi-tiered environment, as data is not copied in certain situations compared to conventional products. For instance, data being unmapped with is not referenced by another location in the storage system may simply be deleted, rather than copied to a new storage location as experienced in conventional products.

Some of the embodiments described herein are also able to achieve improved CPU utilization for the storage system by reducing the number of copy operations performed between tiers of the storage system. For instance, the extents unmapped may be discarded from the faster tier, thereby reducing the number of copy operations that may otherwise be performed to move the discarded extents to a lower tier.

Further still, various embodiments described herein are able to improve the higher tier utilization, as other extents are immediately promoted to take the place of unmapped extents that have been removed from the higher tier. This improves performance of the storage system along with improving utilization of faster tier storage.

Various ones of the embodiments described herein may also be implemented in conjunction with (e.g., in parallel with) conventional data heat management procedures without sacrificing effectiveness of the various improvements described and/or suggested herein. In other words, any of the approaches described herein may be implemented when performing an unmap (or similar) operation, while known data temperature management procedures may be otherwise implemented, e.g., in the background.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or a WAN, or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. The processor may be of any configuration as described herein, such as a discrete processor or a processing circuit that includes many components such as processing hardware, memory, I/O interfaces, etc. By integrated with, what is meant is that the processor has logic embedded therewith as hardware logic, such as an application specific integrated circuit (ASIC), a FPGA, etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer to offer service on demand.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A computer-implemented method, comprising:
receiving, by one or more processors, an unmap command, the unmap command identifying a first logical extent located in a higher storage tier of a multi-tiered data storage system having the higher storage tier and a lower storage tier, each storage tier comprising a plurality of hardware-based data storage devices;
sending, by the one or more processors, an instruction to unmap the first logical extent from the higher storage tier;
sending, by the one or more processors, an instruction to decrement a heat associated with the unmapped first logical extent in response to sending the instruction to unmap the first logical extent;
sending, by the one or more processors, an instruction to remove the unmapped first logical extent from the higher storage tier, wherein sending, by the one or more processors, an instruction to remove the unmapped first logical extent from the higher storage tier includes:
 determining, by the one or more processors, whether data included in the first logical extent is referenced by another location in the multi-tiered data storage system;
 sending, by the one or more processors, instructions to relocate the first logical extent to the lower storage tier in response to determining that the data included in the first logical extent is referenced by another location in the multi-tiered data storage system; and
 sending, by the one or more processors, instructions to delete the data included in the first logical extent in response to determining that data included in the first logical extent is not referenced by another location in the multi-tiered data storage system;
selecting, by the one or more processors, at least one second logical extent located in the lower storage tier for promotion to the higher storage tier, wherein the at least one second logical extent is selected using a heat map; and
sending, by the one or more processors, an instruction to relocate the at least one second logical extent from the lower storage tier to the higher storage tier.

2. The computer-implemented method of claim 1, wherein the first logical extent is part of a space efficient volume.

3. The computer-implemented method of claim 1, wherein the instruction to relocate the at least one second logical extent from the lower storage tier to the higher storage tier is sent by the one or more processors to a tiering data relocator, wherein the tiering data relocator is configured to coordinate the relocation of the at least one second logical extent from one or more of the hardware-based data storage devices in the lower storage tier in which the at least one second logical extent is stored, to one or more of the hardware-based data storage devices in the higher storage tier.

4. The computer-implemented method of claim 1, wherein the instruction to decrement the heat associated with the first logical extent is sent by the one or more processors to a monitoring daemon irrespective of a current heat associated with the first logical extent, wherein the monitoring daemon maintains heat values in physical memory, the heat values corresponding to each of the respective logical extents and/or the data stored in each of the respective logical extents.

5. The computer-implemented method of claim 1, comprising:
sending, by the one or more processors, a request for the heat map, the heat map corresponding to logical extents in the multi-tiered data storage system; and
receiving, by the one or more processors, the heat map.

6. The computer-implemented method of claim 1, wherein selecting, by the one or more processors, the at least one second logical extent is performed using access counters included in the heat map.

7. The computer-implemented method of claim 1, wherein the higher storage tier includes a solid state drive, wherein the lower storage tier includes a hard disk drive.

8. A computer program product comprising a computer readable storage medium having program instructions embodied therewith, wherein the computer readable storage medium is not a transitory signal per se, the program instructions readable and/or executable by one or more processors to cause the one or more processors to perform a method comprising:
receiving, by the one or more processors, an unmap command, the unmap command identifying a first logical extent located in a higher storage tier of a multi-tiered data storage system having the higher storage tier and a lower storage tier, each storage tier comprising a plurality of hardware-based data storage devices;
sending, by the one or more processors, an instruction to unmap the first logical extent from the higher storage tier;
sending, by the one or more processors, an instruction to decrement a heat associated with the unmapped first logical extent in response to sending the instruction to unmap the first logical extent;
sending, by the one or more processors, an instruction to remove the unmapped first logical extent from the higher storage tier;
selecting, by the one or more processors, at least one second logical extent located in the lower storage tier for promotion to the higher storage tier, wherein the at least one second logical extent is selected using a heat map, wherein selecting at least one second logical extent located in the lower storage tier for promotion to the higher storage tier includes:
ordering each logical extent located in the lower storage tier based on their respective heat values, and
selecting the at least one second logical extent located in the lower storage tier having the highest respective heat value(s); and
sending, by the one or more processors, an instruction to relocate the at least one second logical extent from the lower storage tier to the higher storage tier.

9. The computer program product of claim 8, wherein sending, by one or more processors, an instruction to remove the unmapped first logical extent from the higher storage tier includes:
determining, by the one or more processors, whether data included in the first logical extent is referenced by another location in the multi-tiered data storage system;
sending, by the one or more processors, instructions to relocate the first logical extent to the lower storage tier in response to determining that the data included in the first logical extent is referenced by another location in the multi-tiered data storage system; and
sending, by the one or more processors, instructions to delete the data included in the first logical extent in response to determining that data included in the first logical extent is not referenced by another location in the multi-tiered data storage system.

10. The computer program product of claim 8, wherein the first logical extent is part of a space efficient volume, wherein the space efficient volume is a thin provisioned volume.

11. The computer program product of claim 8, wherein the instruction to relocate the at least one second logical extent from the lower storage tier to the higher storage tier is sent by the one or more processors to a tiering data relocator, wherein the tiering data relocator is configured to coordinate the relocation of the at least one second logical extent from one or more of the hardware-based data storage devices in the lower storage tier in which the at least one second logical extent is stored, to one or more of the hardware-based data storage devices in the higher storage tier.

12. The computer program product of claim 8, wherein the instruction to decrement the heat associated with the first logical extent is sent by the one or more processors to a monitoring daemon irrespective of a current heat associated with the first logical extent wherein the monitoring daemon maintains heat values in physical memory, the heat values corresponding to each of the respective logical extents and/or the data stored in each of the respective logical extents.

13. The computer program product of claim 8, the program instructions readable and/or executable by the processor to cause the one or more processors to perform the method comprising:
sending, by the one or more processors, a request for the heat map, the heat map corresponding to logical extents in the multi-tiered data storage system; and
receiving, by the one or more processors, the heat map.

14. The computer program product of claim 8, wherein selecting, by the one or more processors, the at least one second logical extent is performed using access counters included in the heat map.

15. The computer program product of claim 8, wherein the higher storage tier includes a solid state drive, wherein the lower storage tier includes a hard disk drive.

16. A system, comprising:
one or more processors; and
logic integrated with the one or more processors, executable by the one or more processors, or integrated with and executable by the one or more processors, the logic being configured to:
receive, by the one or more processors, an unmap command, the unmap command identifying a first logical extent located in a higher storage tier of a multi-tiered data storage system having the higher storage tier and a lower storage tier, each storage tier comprising a plurality of hardware-based data storage devices;
send, by the one or more processors, an instruction to unmap the first logical extent from the higher storage tier;
send, by the one or more processors, an instruction to decrement a heat associated with the unmapped first logical extent in response to sending the instruction to unmap the first logical extent;
send, by the one or more processors, an instruction to remove the unmapped first logical extent from the higher storage tier, wherein sending an instruction to remove the unmapped first logical extent from the higher storage tier includes:

determining, by the one or more processors, whether data included in the first logical extent is referenced by a pointer from another location in the multi-tiered data storage system;

select, by the one or more processors, at least one second logical extent located in the lower storage tier for promotion to the higher storage tier, wherein the at least one second logical extent is selected using a heat map; and send, by the one or more processors, an instruction to relocate the at least one second logical extent from the lower storage tier to the higher storage tier.

17. The system of claim 16, wherein sending, by the one or more processors, an instruction to remove the unmapped first logical extent from the higher storage tier includes:

sending, by the one or more processors, instructions to relocate the first logical extent to the lower storage tier in response to determining that the data included in the first logical extent is referenced by a pointer from another location in the multi-tiered data storage system; and sending, by the one or more processors, instructions to delete the data included in the first logical extent without relocating the data to another location in the multi-tiered data storage system in response to determining that data included in the first logical extent is not referenced by a pointer from another location in the multi-tiered data storage system.

18. The system of claim 16, wherein the first logical extent is part of a space efficient volume, wherein the space efficient volume is configured such that physical space is allocated to the space efficient volume as data is written thereto, wherein the higher storage tier includes a solid state drive, wherein the lower storage tier includes a hard disk drive.

19. The system of claim 16, the logic being configured to:

send, by the one or more processors, a request for the heat map, the heat map corresponding to logical extents in the multi-tiered data storage system; and receive, by the one or more processors, the heat map, wherein selecting, by the one or more processors, the at least one second logical extent is performed using access counters included in the heat map.

* * * * *